(12) United States Patent  (10) Patent No.: US 8,454,717 B2
Lin  (45) Date of Patent: Jun. 4, 2013

(54) FOLDABLE DUST COLLECTOR

(76) Inventor: Tony Lin, Taichung (TW)

( * ) Notice: Subject to any disclaimer, the term of this patent is extended or adjusted under 35 U.S.C. 154(b) by 317 days.

(21) Appl. No.: 12/902,867

(22) Filed: Oct. 12, 2010

(65) Prior Publication Data

US 2012/0085074 A1  Apr. 12, 2012

(51) Int. Cl.
*B01D 46/00* (2006.01)

(52) U.S. Cl.
USPC .................................. 55/356; 55/358; 55/471

(58) Field of Classification Search
USPC .............. 55/356, 358, 428, 429, 468; 280/29, 280/638, 639, 38, 39, 40, 641, 645, 42, 651, 280/652, 654, 656, 659, 400, 491.1, 491.4, 280/845, 20; 403/169, 170, 177, 178, 186, 403/187, 205, 207, 217–219, 345–347, 401, 403/402
See application file for complete search history.

(56) References Cited

U.S. PATENT DOCUMENTS

| | | | | | |
|---|---|---|---|---|---|
| 4,611,823 | A * | 9/1986 | Haas | ............................ | 280/641 |
| 5,087,013 | A * | 2/1992 | Gress et al. | .................... | 248/676 |
| 5,163,985 | A * | 11/1992 | Chen | ................................ | 55/356 |
| 5,169,420 | A * | 12/1992 | Chen | ................................ | 55/315 |
| 6,507,974 | B1 * | 1/2003 | Cheng | ............................ | 15/347 |
| 6,578,856 | B2 * | 6/2003 | Kahle | ............................ | 280/30 |
| D501,964 | S * | 2/2005 | Cheng | ............................ | D32/21 |
| D502,297 | S * | 2/2005 | Cheng | ............................ | D32/21 |
| 7,077,421 | B2 * | 7/2006 | Wu | ................................ | 280/645 |
| 7,213,829 | B2 * | 5/2007 | Wu | ................................ | 280/645 |
| 7,222,865 | B2 * | 5/2007 | Chen et al. | ...................... | 280/30 |
| 7,255,355 | B2 * | 8/2007 | Chisholm et al. | ............... | 280/30 |
| D550,476 | S * | 9/2007 | Liu et al. | ........................ | D34/24 |
| 7,278,646 | B2 * | 10/2007 | Chuang | ........................ | 280/47.34 |
| 7,331,596 | B2 * | 2/2008 | Tiramani et al. | ............. | 280/643 |
| 7,487,947 | B2 * | 2/2009 | Liu et al. | ....................... | 248/439 |
| 7,494,149 | B2 * | 2/2009 | Liu et al. | ....................... | 280/639 |
| 7,695,537 | B2 * | 4/2010 | Cheng | ............................ | 55/467 |
| 7,849,966 | B2 * | 12/2010 | Chiu | ............................. | 182/153 |
| 8,047,553 | B2 * | 11/2011 | Voong | ............................. | 280/30 |
| 2005/0199768 | A1 * | 9/2005 | Tam et al. | ..................... | 248/129 |
| 2006/0075943 | A1 * | 4/2006 | Chen et al. | ..................... | 108/115 |
| 2006/0260282 | A1 * | 11/2006 | Peng | ............................. | 55/356 |
| 2008/0067786 | A1 * | 3/2008 | Liu et al. | ....................... | 280/639 |
| 2009/0289429 | A1 * | 11/2009 | Voong | ............................. | 280/30 |
| 2010/0096530 | A1 * | 4/2010 | Chiu | ............................. | 248/439 |
| 2012/0096820 | A1 * | 4/2012 | Wang | ............................. | 55/356 |

FOREIGN PATENT DOCUMENTS

TW  M336816  7/2008

* cited by examiner

*Primary Examiner* — Duane Smith
*Assistant Examiner* — Sonji Turner
(74) *Attorney, Agent, or Firm* — Muncy, Geissler, Olds & Lowe, PLLC

(57) ABSTRACT

A foldable dust collector of the present invention includes a supporting portion, a case and an air pump. The supporting portion is foldable. The case is disposed on the supporting portion. The case is pivotable with respect to the supporting portion. The air pump is disposed on the case. The air pump is used for drawing air into the case.

Therefore, the foldable dust collector of the present invention can be transformed. A width of the foldable dust collector is changeable. As such, the foldable dust collector is easier to be stored or be transported. Moreover, the foldable dust collector can be used in a small space.

6 Claims, 5 Drawing Sheets ent embodiment can be assembled with dust collecting bag. The foldable dust collector is used for filtering dust out of the air which is drawn therein. The foldable dust collector of the present embodiment includes a supporting portion, a case 2, and an air pump 3.

FOLDABLE DUST COLLECTOR

BACKGROUND OF THE INVENTION

1. Field of the Invention

The present invention relates to a dust collector.

2. Description of the Prior Art

Conventional dust collector usually includes a framework, as shown in TW M336816. The framework is used for being assembled with the components so as to support the components.

However, it is difficult to store or to transport such dust collector. Space occupied by the dust collector is considerably large. Moreover, it is difficult to use the dust collector in a small room.

The present invention is, therefore, arisen to obviate or at least mitigate the above mentioned disadvantages.

SUMMARY OF THE INVENTION

The main object of the present invention is to provide a dust collector which can be stored or be transported easily.

To achieve the above and other objects, a foldable dust collector of the present invention includes a supporting portion, a case and an air pump.

The supporting portion includes a first rack and a second rack. Each one of the first rack and the second rack has a bottom end. The bottom ends are adapted for resting on the ground, so that the supporting portion is able to stand on the ground. A first distance is defined between the bottom ends. The first rack is movable between a first position and a second position with respect to the second rack, so that a length of the first distance is changeable.

The case is disposed on the supporting portion. A longitudinal direction is defined by the case. The case is pivotable between a third position and a fourth position. The longitudinal direction is horizontal when the case is located at the third position. The longitudinal direction is vertical when the case is located at the fourth position. An inlet, an outlet and a gas passage are defined by the case. The gas passage communicates with the inlet and the outlet.

The air pump is firmly disposed on the case. The air pump is used for drawing air from the inlet to the outlet.

The present invention will become more obvious from the following description when taken in connection with the accompanying drawings, which show, for purpose of illustrations only, the preferred embodiment(s) in accordance with the present invention.

DETAILED DESCRIPTION OF THE PREFERRED EMBODIMENTS

Figure 1:
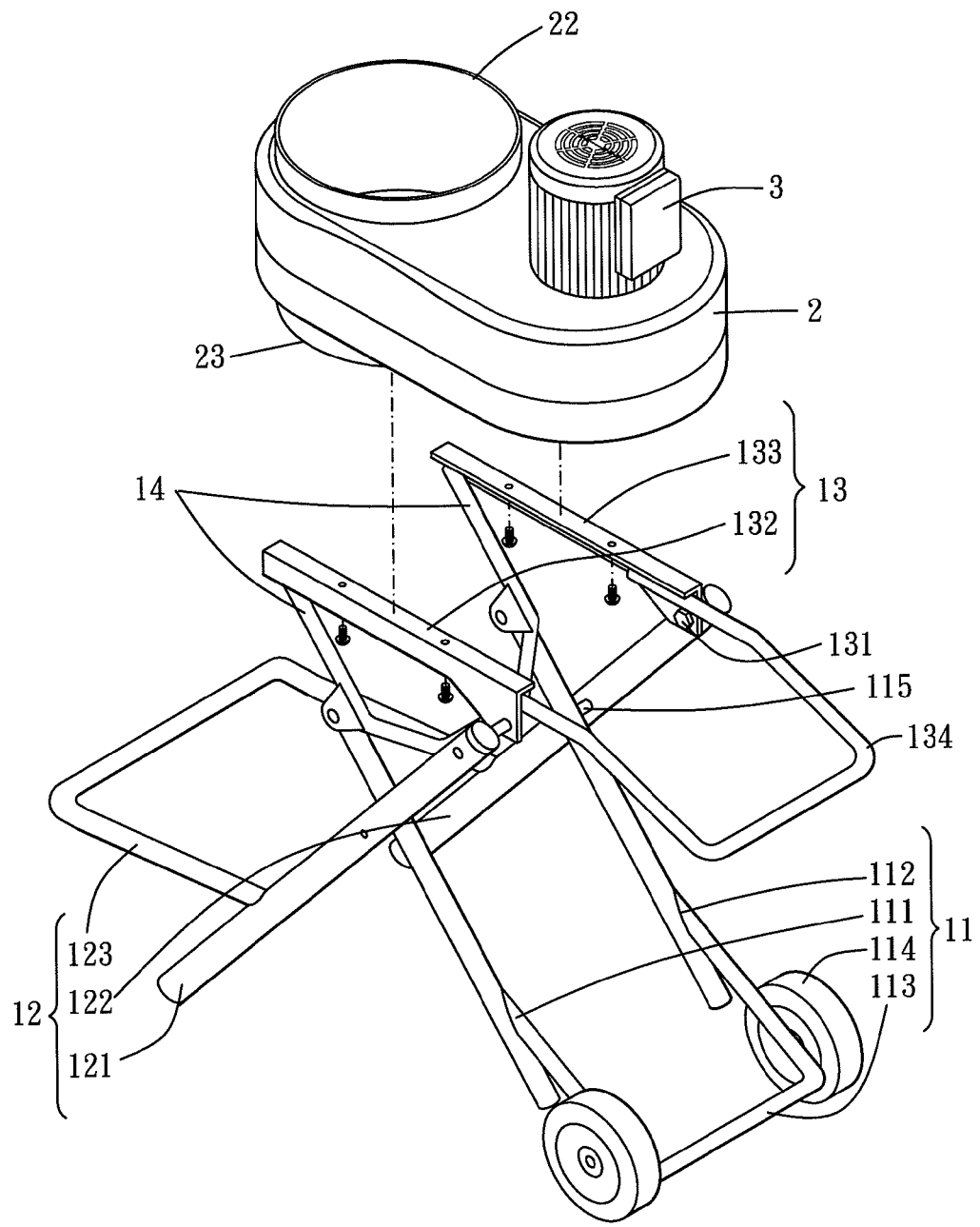
FIG. 1 is a breakdown drawing showing a preferred embodiment of the present invention.

Please refer to FIG. 1 to FIG. 4 for a preferred embodiment of the present invention. The foldable dust collector of the present embodiment can be assembled with dust collecting bag. The foldable dust collector is used for filtering dust out of the air which is drawn therein. The foldable dust collector of the present embodiment includes a supporting portion, a case 2, and an air pump 3.

The supporting portion includes a first rack 11 and a second rack 12. The supporting portion may further include a third rack 13 and a connecting portion 14. The first rack 11 has a bottom end which is used for resting on the ground. Preferably, the first rack includes a first left pole 111, a first right pole 112, a lateral pole 113 and two wheels 114. The lateral pole 113 connects the first left pole 111 to the first right pole 112, so that the first left pole 111 and the first right pole 112 are in an operative relationship. The wheels 114 are disposed on the first left pole 111 and the first right pole 112 individually. The wheels 114 are used for being placed on the ground, so that the first rack 11 is able to move on the ground.

The second rack 12 has a bottom end which is used for resting on the ground. The second rack 12 is disposed on the first rack 11. A first distance is defined between the bottom ends of the first rack 11 and the second rack 12. The first rack 11 is able to move with respect to the second rack 12 between a first position and a second position. As such, a length of the first distance is changeable. Preferably, the second rack 12 includes a second left pole 121 and a second right pole 122. The second rack 12 may further include a protruding portion 123. The protruding portion 123 connects the second left pole 121 to the second right pole 122, so that the second left pole 121 and the second right pole 122 are in an operative relationship. The first left pole 111 and the first right pole 112 have a first axial portion 115. A first axis is defined by the first axial portion 115. The second left pole 121 is pivotably connected to the first left pole 111 about the first axis. The second right pole 122 is pivotably connected to the first right pole 112 about the first axis. As such, the first rack 11 is pivotable about the first axis with respect to the second rack 12 between a first position and a second position. In other possible embodiments of the present invention, the first rack may be slidably connected to the second rack, so that the length of the first distance is still changeable. The protruding portion 123 extends away from the first rack 11. A distal end of the protruding portion 123 is used for resting on the ground when the first rack 11 is located at the second position.

The third rack 13 is pivotably disposed on a top end of the second rack 12 about a second axis, so that the third rack 13 is pivotable with respect to the second rack 12. More specifically, the third rack includes a third left pole 132 and a third right pole 133. The third left pole 132 and the third right pole 133 have a second axial portion 131. The second axis is defined by the second axial portion 131. The third left pole 132 is pivotably connected to the second left pole 121 about the second axis. The third right pole 133 is pivotably connected to the second right pole 122 about the second axis. An end of the third rack 13 may be assembled with a handle 134. The handle 134 connects the third left pole 132 to the third right pole 133. The handle 134 is adapted for user to grab, so that the supporting portion can be pushed or be pulled easily.

An end of the connecting portion 14 is pivotably disposed on a top end of the first rack 11. Another end of the connecting portion 14 is pivotably disposed on the third rack 13. As such, the connecting portion 14 is pivotable with respect to the first rack 11 and the third rack 13.

The case 2 is firmly disposed on the third rack 13. The case 2 swings between a third position and a fourth position when the third rack 13 pivots about the second axis. A longitudinal direction is defined by the case 2. The longitudinal direction is horizontal when the case 2 is located at the third position.

The longitudinal direction is vertical when the case 2 is located at the fourth position. An inlet 21, an outlet 22 and a gas passage (not shown) are defined by the case 2. The case 2 may have an opening 23. The gas passage communicates the inlet 21 to the outlet 22. The opening 23 communicates with the outlet 22. The outlet 22 is located on a top surface of the case 2. The opening 23 is located on a bottom surface of the case 2. Preferably, the gas passage is parallel to the longitudinal direction. The gas passage has two ends. The inlet 21 is located at one end of the gas passage. The outlet 22 and the opening 23 are located at the other end of the gas passage. In other possible embodiments of the present invention, the case 2 may be pivotably disposed on the second rack 12 directly. In other words, the third rack 13 may be omitted.

The air pump 3 is firmly disposed on the case 2. More particularly, the air pump 3 is located at one end of the gas passage at where the inlet 21 is located. The air pump 3 is used for drawing air from the inlet 21 to the outlet 22. More specifically, the air pump 3 may include a motor and a blade. The motor can receive electric power driving the blade to rotate. The blade pushes air to move toward the outlet 22.

Figure 2:
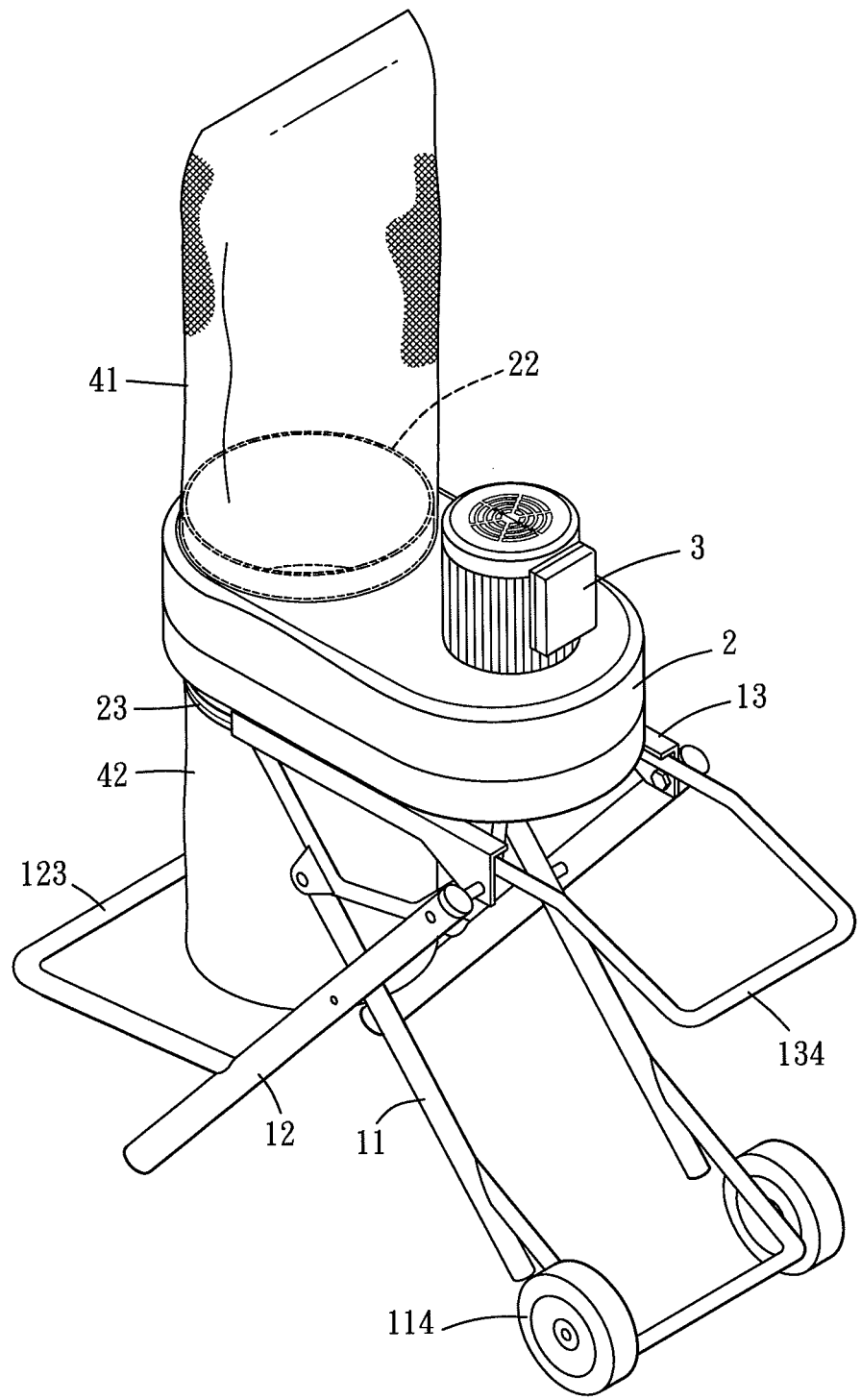
FIG. 2 is a stereogram showing a preferred embodiment of the present invention.

Accordingly, when the first rack 11 is located at the first position, the bottom end of the first rack 11 is away from the bottom end of the second rack 12, as shown in FIG. 2. The supporting portion is able to stand stably on the ground. The case 2 is located at the third position. Filtering bag 41 may be assembled on the outlet 22 so as to filter dust out of air. Dust is held in the filtering bag 41. Collecting bag 42 may be assembled on the opening 23 so as to receive the dust falling from the filtering bag 41.

Figure 3:
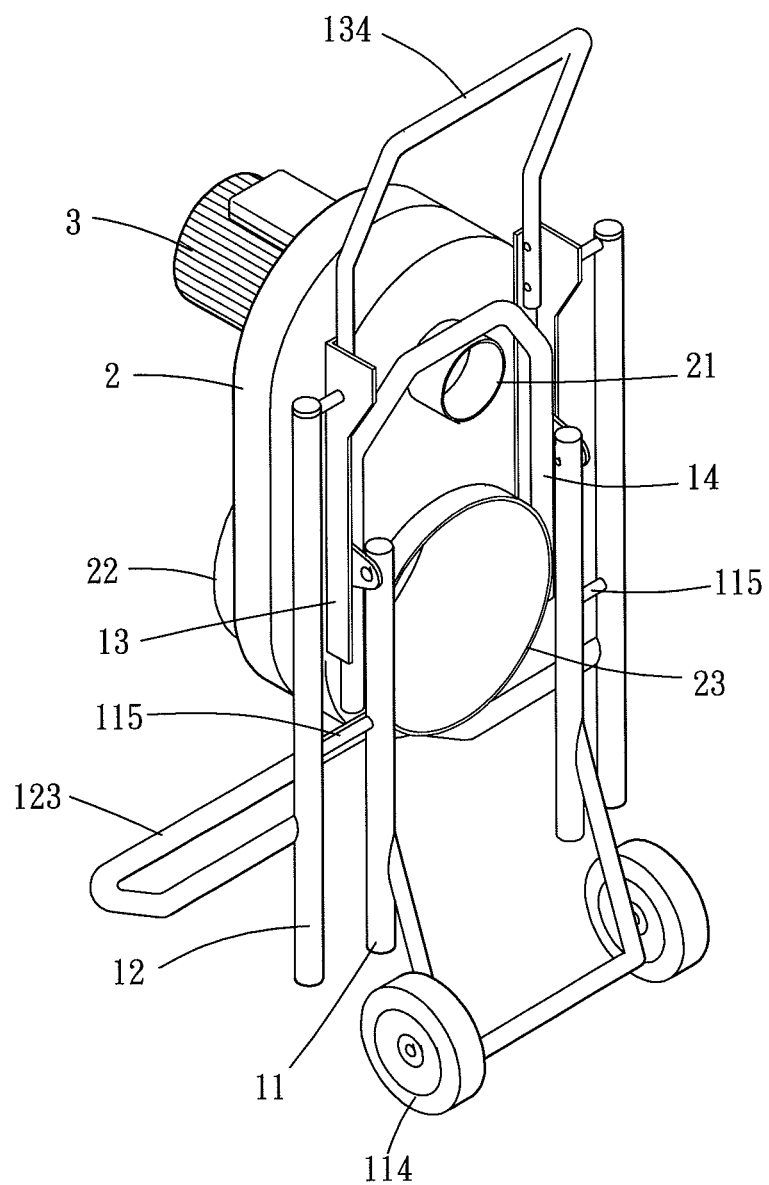
FIG. 3 is a stereogram showing a foldable dust collector which is transformed.
Figure 4:
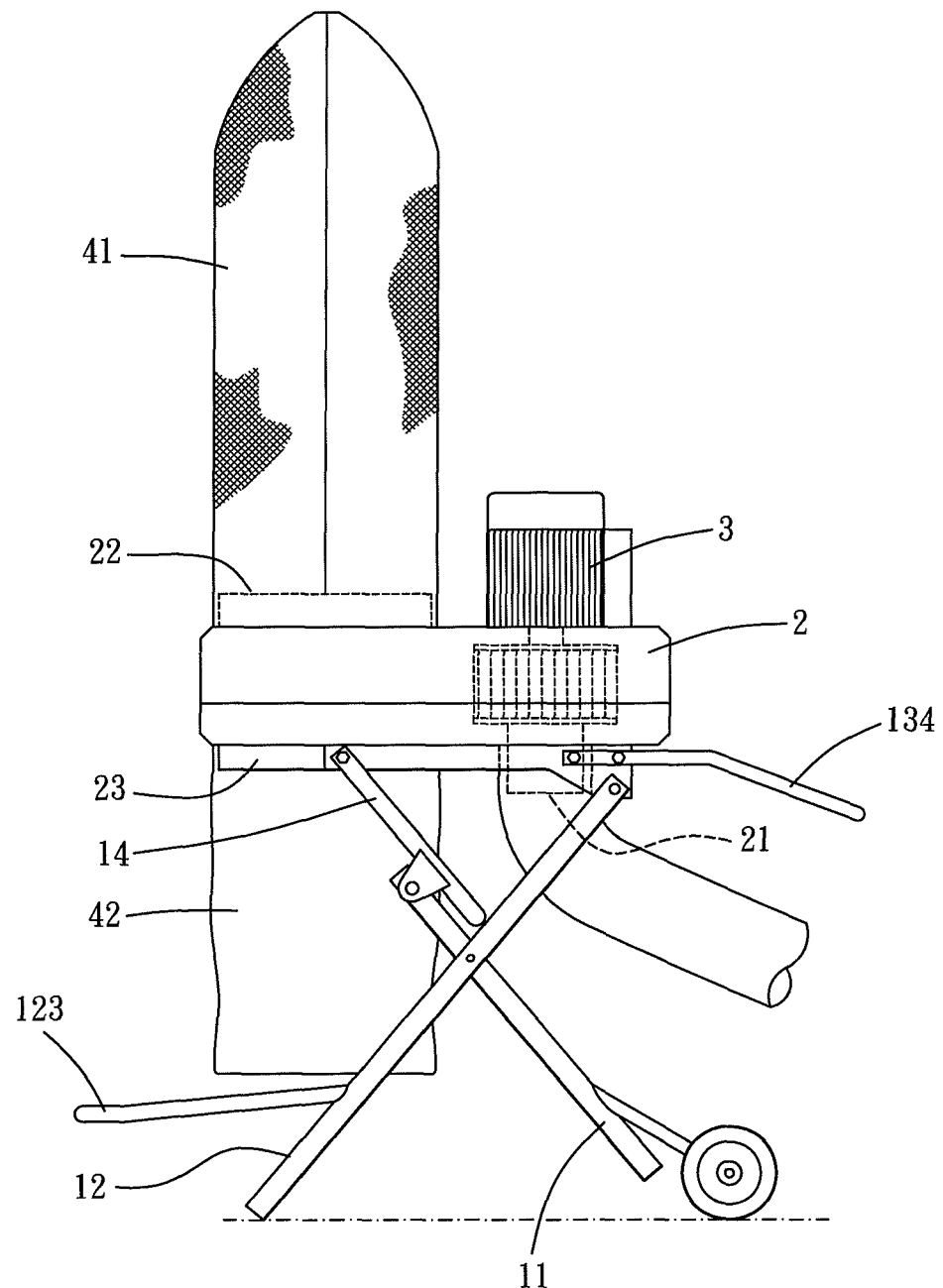
FIG. 4 is a side view showing a using state of a preferred embodiment of the present invention.

The bottom end of the first rack 11 is close to the bottom end of the second rack 12 when the first rack 11 is located at the second position, as shown in FIG. 3. The supporting portion can also stand on the ground with the first rack 11 and the protruding portion 123. The third rack 13 is drawn by the first rack 11 and the connecting portion 14, so that the case 2 is located at the fourth position. When the first rack 11 swings to the first position from the second position, the connecting portion 14 abuts against the first rack 11, as shown in FIG. 4. The position of the first rack 11 is limited by the connecting portion 14.

To conclude, the foldable dust collector is able to be transformed. A width of the foldable dust collector can be shortened by transforming the foldable dust collector. As such, space occupied by the machine is changeable. The foldable dust collector is easier to be stored or to be transported.

Figure 5:
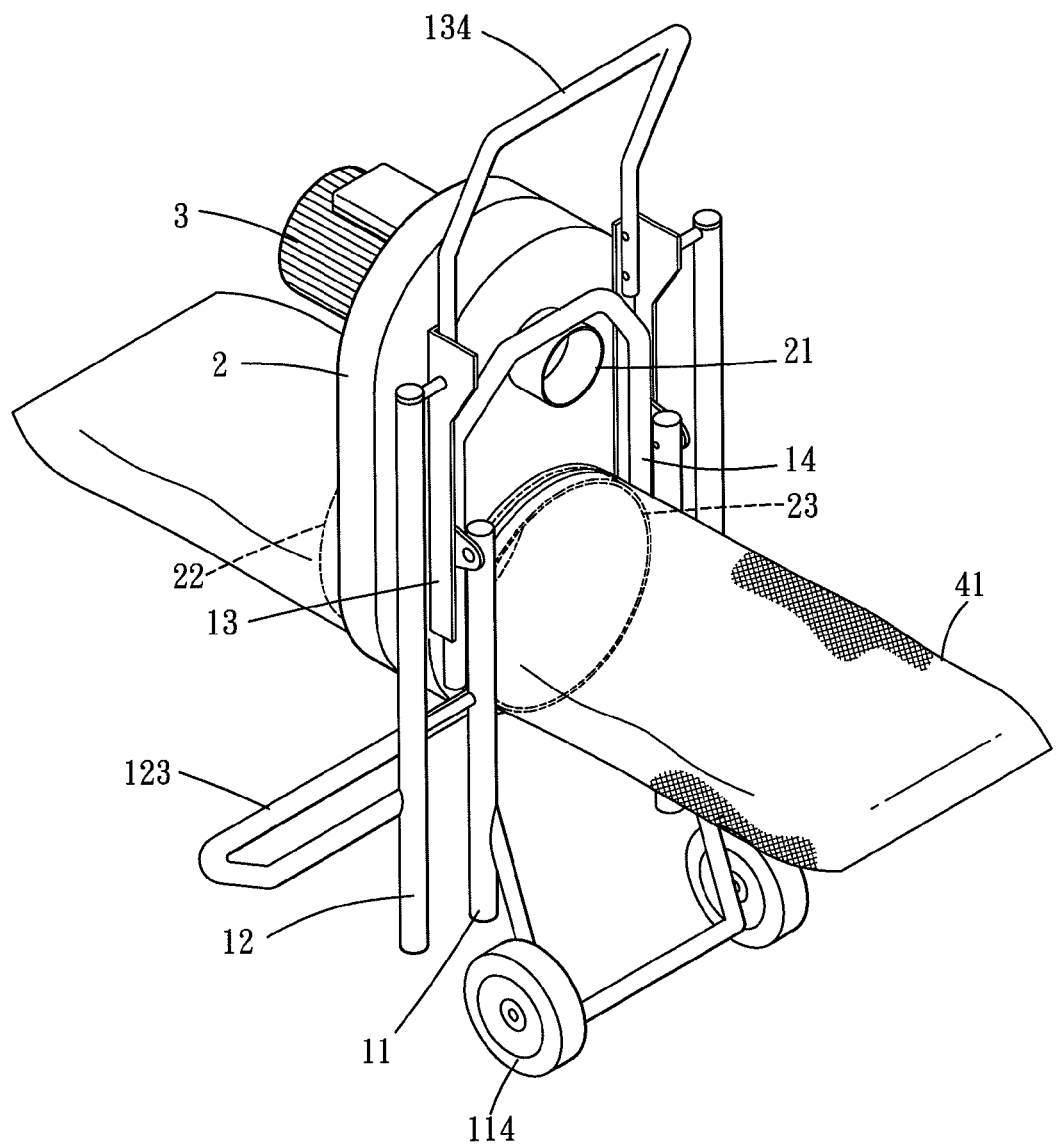
FIG. 5 is a stereogram showing another using state of a preferred embodiment of the present invention.

The foldable dust collector is used for collecting dust when the case is located at the third position, as shown in FIG. 2. In addition, the foldable dust collector may also be used for collecting dust when the case 2 is located at the fourth position, as shown in FIG. 5. Filtering bags may be assembled on the outlet 22 and on the opening 23. As such, the foldable dust collector can be used in a small room.

What is claimed is:

1. A foldable dust collector, comprising:
    a supporting portion, comprising a first rack and a second rack, each one of the first rack and the second rack having a bottom end, the bottom ends being adapted for resting on the ground, so that the supporting portion is able to stand on the ground, a first distance being defined between the bottom ends, the first rack being movable between a first position and a second position with respect to the second rack, so that a length of the first distance is changeable;
    a case, being disposed on the supporting portion, a longitudinal direction being defined by the case, the case being pivotable between a third position and a fourth position, the longitudinal direction being horizontal when the case is located at the third position, the longitudinal direction being vertical when the case is located at the fourth position, an inlet, an outlet and a gas passage being defined by the case, the gas passage communicating with the inlet and the outlet;
    an air pump, firmly disposed on the case, the air pump being used for drawing air from the inlet to the outlet
    wherein the second rack comprises a protruding portion, the protruding portion extends away from the first rack and extends slantly downwardly from a portion of the second rack which is located away from the bottom end of the second rack by a distance, the supporting portion is able to stand on the ground with the first rack and the second rack where a distal end of the protruding portion is rested on the ground when the first rack is located at the second position;
    wherein the supporting portion comprises a third rack, the third rack is pivotably disposed on a top end of the second rack about a second axis, the case is firmly disposed on the third rack, the case swings between the third position and the fourth position when the third rack pivots about the second axis;
    wherein the supporting portion comprises a connecting portion, an end of the connecting portion is pivotably disposed on a top end of the first rack, another end of the connecting portion is pivotably disposed on the third rack, an end portion of the connecting portion abuts against and overlaps on a first side of the first rack axially when the first rack is located at the first position, an body portion extending axially from the end portion of the connecting portion abuts against and overlaps on a second side which is opposite to the first side of the first rack axially when the first rack is located at the second position.

2. The foldable dust collector of claim 1, wherein the first rack comprises a first left pole and a first right pole, the first left pole and the first right pole are in an operative relationship, the second rack comprises a second left pole and a second right pole, the second left pole and the second right pole are in an operative relationship, the first left pole is pivotably connected to the second left pole about a first axis, the first right pole is pivotably connected to the second right pole about the first axis, so that the first rack is pivotable about the first axis with respect to the second rack between the first position and the second position.

3. The foldable dust collector of claim 2, wherein the protruding portion extends away from the first rack and extends slantly downwardly relative to longitudinal directions of the second left pole and the second right pole, the supporting portion is able to stand on the ground with the first rack and the second rack where the distal end of the protruding portion is rested on the ground when the case is located at the fourth position, the end portion of the connecting portion abuts against and overlaps on the first side on the first left pole and the first right pole axially when the first rack is located at the first position, the body portion of the connecting portion abuts against and overlaps on the second side on the first left pole and the first right pole axially when the first rack is located at the second position.

4. The foldable dust collector of claim 1, wherein the gas passage is parallel to the longitudinal direction, the gas passage has two ends, the air pump and the inlet are located at one end of the gas passage, the outlet is located at the other end of the gas passage.

5. The foldable dust collector of claim 3, wherein the distal end of the protruding portion includes a lateral portion connected between the second left pole and the second right pole, and is rested on the ground when the case is located at the fourth position.

6. The foldable dust collector of claim 3, wherein when the first rack is located at the second position, the second left pole and the second right pole are substantially perpendicular to the ground and the protruding portion slantly extends toward the ground and is angled relative to the second left pole and the second right pole, so that the distal end of the protruding portion and the bottom end of the first rack are rested on the ground firmly.

\* \* \* \* \*